United States Patent [19]
Elmer et al.

[11] 3,754,978
[45] Aug. 28, 1973

[54] DEVITRIFICATION-RESISTANT COATING FOR HIGH-SILICA GLASSES

[75] Inventors: Thomas H. Elmer, Corning; Joseph W. Malmendier, Painted Post, both of N.Y.

[73] Assignee: Corning Glass Works, Corning, N.Y.

[22] Filed: Aug. 6, 1971

[21] Appl. No.: 169,823

[52] U.S. Cl............... 117/124 A, 65/30, 106/47, 106/48, 106/52, 117/46 FC, 117/125
[51] Int. Cl....... C03c 17/02, C03c 5/00, C03c 9/00
[58] Field of Search............ 117/125, 46 FC, 124 A; 65/30, 33; 106/390 V

[56] References Cited
UNITED STATES PATENTS

| | | | |
|---|---|---|---|
| 3,458,345 | 7/1969 | Fenner | 117/125 |
| 3,414,465 | 12/1968 | Baak et al. | 117/125 |
| 3,303,399 | 2/1967 | Hoogendoorn et al. | 117/200 |
| 3,540,896 | 11/1970 | Flicker | 117/46 FC |
| 3,539,387 | 11/1970 | Kelly et al | 117/125 |

OTHER PUBLICATIONS

Krauth et al., "Plazma-Sprayed Glass Coatings of Zirconia-Alumina Mixtures," Chem. Abst., Vol. 64, 17221b, (1966).

*Primary Examiner*—William D. Martin
*Assistant Examiner*—William H. Schmidt
*Attorney*—Clarence R. Patty, Jr. et al.

[57] ABSTRACT

A devitrification-resistant glaze for high-silica glasses, particularly effective in inhibiting surface devitrification induced by contact with food-ash at elevated temperatures, formed from a coating consisting essentially, in weight percent, of about 25-85 percent $Al_2O_3$ and 15-75 percent $ZrO_2$, and optionally containing up to about 10 percent $Ta_2O_5$. The coating is preferably applied in the form of an aqueous slurry which is dried and fired to produce a vitreous glaze.

3 Claims, No Drawings

DEVITRIFICATION-RESISTANT COATING FOR HIGH-SILICA GLASSES

BACKGROUND OF THE INVENTION

The coatings of the present invention are related to the coatings described in the co-pending U.S. Pat. Application of J. W. Malmendier, Ser. No. 169,824, filed concurrently and commonly assigned herewith. However, glazes produced from the coatings described in the co-pending application are useful primarily in inhibiting devitrification in high-silica glasses induced by contact with highly alkaline atmospheres or solutions at elevated temperatures.

This invention has applicability principally in the field of high-silica and fused silica glasses. Devitrification of these glasses, rather than softening, often limits their use temperature and duration of use. For this reason, means for stopping or retarding surface devitrification in high-silica glasses have long been sought. The rates of devitrification of the glass depend on many variables, including the amounts of impurities in the glass, the moisture content of the glass-making materials used, the temperature of the environment, and the composition of the ambient atmosphere. Since it is difficult to regulate these variables during the actual use of the material, it would be desirable to develop a glaze which could inhibit the devitrification of high-silica glasses independently of these variables under all types of conditions. Among the conditions which are known to induce devitrification in high-silica glasses are elevated temperatures and highly alkaline conditions, such as might be encountered in alkali metal vapor lamps or highly alkaline solutions or atmospheres. However, we have also found devitrification to be associated with the process of food-staining induced in high-silica burner plates by contact with the ash of certain foods at elevated temperatures.

Earlier attempts by others to inhibit devitrification in high-silica glasses centered on additions of $ZrO_2$, $TiO_2$, or $Al_2O_3$ to the glass as dopants, but with inconsistent results. A very complete literature review is given up to the year 1957 in the thesis of S. D. Brown, entitled "The Devitrification of High Temperature Glass," Ph. D. Thesis, University of Utah (1957). This survey of the literature on devitrification was extended to 1962 by F. E. Wagstaff in "Kinetics of Crystallization of Vitreous Silica," Ph. D. Thesis, University of Utah (1962). The devitrification of high-silica glasses usually results in the formation of cristobalite. An excellent description of the process is given by Ainslie et al., in a paper presented at the 1962 Symposium on the Nucleation and Crystallization of Glass.

In the present work, protection from devitrification was sought by the formation of surface glazes. Glazing is easily adapted to production and not likely to interfere with the bulk properties of a glass. The objective was to inhibit the devitrification observed in high-silica burner plates caused by contact with certain types of food-ash at elevated temperatures, e.g., above about 500°C. This devitrification is presumed to be induced by the alkali-metal salt content of the ash, since certain foods containing significant amounts of such salts, such as bacon fat and chocolate pudding, are particularly effective in promoting surface crystallization.

SUMMARY OF THE INVENTION

We have now discovered certain protective glaze compositions which are quite effective in inhibiting devitrification in high-silica glasses induced by contact with food ash at elevated temperatures. These glazes consist essentially of $Al_2O_3$ and $ZrO_2$, and may optionally contain minor amounts of $Ta_2O_5$. They are formed by applying to the glass a coating consisting essentially of the described oxides, or of compounds thermally decomposable to yield the described oxides in specified proportions, and then firing the coating to cause it to react with the glass to form a vitreous glaze. The coating is preferably applied in the form of an aqueous slurry or suspension of the desired compounds, then dried, and finally reacted with the surface of the glass by heating with a gas-oxygen flame, although other methods of deposition such as plasma spraying, flame spraying, or vapor deposition would also be suitable. Coatings suitable for use in applying the glazes of the invention may consist, on the oxide basis, that is, on the basis of the composition of the oxide mixture resulting when the coating is heated on firing, of about 25-85 percent $Al_2O_3$, 15-75 percent $ZrO_2$, and, optionally, up to about 10 percent $Ta_2O_5$ by weight. Especially preferred are coatings consisting essentially, in weight percent on the oxide basis, of about 65-75 percent $Al_2O_3$ and 25-35 percent $ZrO_2$.

DESCRIPTION OF THE PREFERRED EMBODIMENTS

The glazes produced from the coatings of the present invention are particularly suitable for use with fused silica and with high-silica glasses such as reconstructed 96 percent silica glasses. Examples of the latter include Corning Code 7913 glass. These materials are presently used for numerous high-temperature applications, the most pertinent for the purpose of the present invention being the manufacture of burner plates for electric cooking appliances. Food spilled on such plates can, at elevated temperatures, form residues which are effective in inducing devitrification, etching, and staining of the glass surface. Since the removal of stains from the devitrified regions of the glass is quite difficult, the coatings of the present invention are intended to alleviate the problem by preventing surface devitrification under the conditions described.

Both $Al_2O_3$ and $ZrO_2$ are essential constituents of the protective glazes of the invention. Each of these compounds has the capability of retarding devitrification to some degree under adverse conditions, but neither alone is sufficient to prevent devitrification in high-silica glasses in contact with certain kinds of food-ash at elevated temperatures. $Ta_2O_5$ has been found to be an effective agent in preventing devitrification in high-silica glasses under strongly alkaline conditions, but it is only partially effective in inhibiting the devitrification, etching, and staining caused by food-ash, and should be included in the coatings of the present invention only in amounts ranging up to about 10 percent by weight. Hence, we have found that coatings suitable for producing glazes providing protection against devitrification induced by food-ash at elevated temperatures may consist, in weight percent on the oxide basis, of about 25-85 percent $Al_2O_3$, 15-75 percent $ZrO_2$, and 0-10 percent $Ta_2O_5$. Especially preferred for ease of application and compatibility with high-silica substrates in terms of thermal and physical properties are coatings consisting essentially, in weight percent on the oxide basis, of about 65-75 percent $Al_2O_3$ and 25-35 percent $ZrO_2$. The exact compositions of the resultant glazes produced according to the invention are not readily determined, since the glazes are a reaction product of the coatings and the glass substrates.

Our preferred method of applying the coatings of the present invention involves the use of a slurry or colloidal suspension of the desired oxides, or compounds decomposable upon firing to yield the desired oxides, in water. The steps of the method normally comprise preparing an aqueous suspension consisting essentially of a coating component and a water component, wherein the coating component consists essentially of compounds which, upon firing, will yield, in weight percent on the oxide basis, about 25–85 percent $Al_2O_3$, 15–75 percent $ZrO_2$, and 0–10 percent $Ta_2O_5$, said coating component comprising about 4–15 percent by weight of the suspension, applying the suspension to the glass article to be coated, drying the suspension on the glass to form an evaporation product layer, and firing the evaporation product layer to form a vitreous protective glaze on the glass. While in many cases the oxides themselves will comprise the coating component of the suspension, and thus, the evaporation product layer, other compounds may be substituted which will yield the required oxides in the desired proportions upon firing the evaporation product layer to form a vitreous glaze. For example, we prefer to use $TaCl_5$ rather than $Ta_2O_5$ in preparing suspensions according to the present invention because it dissolves easily and reacts readily with the substrate. This merely involves incorporating $TaCl_5$ into the suspension in quantities such that the fired coating will contain about 0–10 percent $Ta_2O_5$, as calculated in weight percent on the oxide basis, from the proportions of coating compounds contained in the slurry.

Insoluble solids used in making up the slurry should have a particle size small enough to be both readily mixed and reasonably stable in suspension. Of course, volatile solvents other than water may be used to form the suspension, if desired.

We have also found it desirable in preparing the aqueous suspensions described, to adjust the pH thereof with, for example, HCl or $NH_4OH$, in order to improve the stability of the suspension. Preferably, the pH of the slurries prepared as described will range between about 8 and 9, as the result of minor additions of either of these two compounds.

The preferred method for applying the slurries to the glass article to be protected comprises dipping the glass into the slurries. In applying the slurry, care must be taken not to obtain an excessively thick coating. It has been found that there is a thermal expansion difference between the glazes of the invention and the high-silica base glasses to which they will normally be applied, and crazing has been observed in excessively thick glazes as a result of this expansion difference. Glazes ranging in thickness after firing from about 10–50 microns are sufficent to provide good devitrification protection while avoiding the problem of crazing, particularly if the preferred compositions are used. Glazes within this thickness range are readily obtained by a single dip coating in slurries having a solids content in the range from about 7–14 percent by weight.

After applying the slurries to the glass, the moisture should be removed from the coating prior to firing. The drying process may be accelerated by heating, for example, in an oven, under a heat lamp, or with a flame, if desired. However, excessively rapid heating should be avoided because it may cause peeling and crazing of the coating.

Following drying, the coating is fired to a temperature sufficient to cause the fusion and interaction thereof with the glass substrate. We have found that this can conveniently be accomplished with the aid of a natural gas-oxygen flame without the need for heating the entire glass article to the temperature at which the coating will fuse to form a vitreous layer. Hence, sufficient heating to cause reaction of the coating with the glass substrate to form a vitreous glaze can be accomplished by directing a gas-oxygen flame onto the area of the coating to be reacted for a period of several seconds, or until the coating has been converted to the vitreous state as a result of reacting with the high-silica glass substrate.

The effectiveness of glazes provided according to the described method in inhibiting devitrification in high-silica glasses was determined by a series of experiments wherein several Corning Code 7913 (96 percent silica) glass plates, each having a portion of its surface protected by a glaze, were coated with certain foods and then subjected to elevated temperatures. The composition of the protective glazes varied from sample to sample so that the effect of coating composition on the protective qualities of the glazes could be judged. The test conditions comprised covering the samples thoroughly with bacon fat in one area and chocolate pudding in another, and then placing them in a furnace. The furnace was then heated to a temperature of 750°C. and maintained at that temperature for 16 hours. At the end of this test period, the furnace and contents were cooled and the samples were removed and examined for devitrification. In each case, the unprotected portions of the samples were severely devitrified, having a surface crystallization identified by X-ray diffraction as alpha-cristobalite, while the protected portions exhibited varying degrees of devitrification depending upon the protective capabilities of each reacted coating. Representative tests are set forth in Table I below, which lists the results for several different coating compositions and compares the degree of devitrification observed in the unglazed portion with that observed in the glazed portion in each case. The degree of devitrification was judged on a qualitative basis, with extensive surface crystallization typified by a heavy frost being termed severe, intermediate surface crystallization being termed moderate, and light surface crystallization typified by a hazy surface appearance being termed slight. In the case of coatings within the range of compositions of the invention, no surface haze or crystallization could be detected in the glazed surface regions of any of the samples, and the glazed regions were determined to be completely amorphous by examination according to X-ray diffraction techniques.

TABLE I

SURFACE DEVITRIFICATION—CODE 7913 PLATES FOOD ASH—16 HOURS AT 750°C.

| Sample | Coating Composition | Devitrification Unglazed Region | Glazed Region |
|---|---|---|---|
| 1 | 100% $ZrO_2$ | severe | severe |
| 2 | 80% $ZrO_2$-20% $Al_2O_3$ | severe | slight |
| 3 | 75% $ZrO_2$-25% $Al_2O_3$ | severe | none |
| 4 | 50% $ZrO_2$-50% $Al_2O_3$ | severe | none |
| 5 | 25% $ZrO_2$-75% $Al_2O_3$ | severe | none |
| 6 | 15% $ZrO_2$-85% $Al_2O_3$ | severe | none |
| 7 | 10% $ZrO_2$-90% $Al_2O_3$ | severe | slight |

| | | | |
|---|---|---|---|
| 8 | 100% Al₂O₃ | severe | moderate |
| 9 | 70% Al₂O₃-21% ZrO₂-9% Ta₂O₅ | severe | none |
| 10 | 60% Al₂O₃-20% ZrO₂-20% Ta₂O₅ | severe | slight |

From a review of data of this kind, we have concluded that glazes produced from coatings wherein $ZrO_2$ and $Al_2O_3$ are present in the proper proportions can provide protection from devitrification and food staining under the conditions described, and can be expected to be reasonably stain-resistant in actual use.

The invention may be further understood by reference to the following detailed examples which illustrate the best mode contemplated by the inventors for carrying our their invention.

EXAMPLE I

A 400 ml. beaker containing 90 ml. of $H_2O$ was placed under a propeller-type variable-speed mixer and stirring was commenced at a moderate speed. Approximately 7 grams of powdered alumina, having particle sizes in the range from about 0.01 to 0.05 microns was slowly added to the water in the beaker while stirring was continued. Next, approximately 3 grams of powdered zirconia also having particle sizes in the range from about 0.01 to 0.05 microns was added to the mixture while stirring was continued. The pH of the slurry was then adjusted to about 8.5 through the addition of $NH_4OH$ and the mixer was then turned off. A 1½ inch square Corning Code 7913 glass plate about 4 millimeters in thickness and comprised of about 96 percent silica by weight was then dipped in the slurry for about 30 seconds, removed, and air-dried until visible moisture was no longer evident. It was then further dried with a yellow gas flame having a temperature estimated to be about 650°C. Following drying, the coating was reacted with the substrate by heating with a gas-oxygen flame. The coating was completely transformed into a vitreous layer by flame treating for a few seconds. After this treatment the coated and uncoated materials could not be distinguished by visual inspection.

EXAMPLE II

The glazed sample prepared according to Example I was subjected along with an unglazed Corning Code 7913 glass plate to a food-ash corrosion test as hereinbefore described, wherein each sample was covered partly with chocolate pudding and partly with bacon fat, heated to a temperature of 750°C. in a furnace, and maintained at that temperature for 16 hours. Jello brand instant chocolate pudding and Danish bacon fat containing about 1 gram of NaCl per 50 cc. of melted fat were employed. Following heat treatment, the samples were cooled and examined, and it was determined that, while the unglazed plate had severely devitrified at all portions of the surface contacted with food-ash, the plate prepared according to Example I remained completely vitreous and suffered no surface crystallization apparent either by visual inspection or examination according to X-ray diffraction techniques.

From the above examples, we have concluded that the protective glazes produced from the coatings of the invention offer a useful solution to the problem of surface devitrification and staining induced in high-silica glasses by contact with food-ash at elevated temperatures.

We claim:

1. A high-silica glass article coated with a devitrification-resistant glaze formed by firing onto said article a coating consisting essentially, in weight percent on the oxide basis, of about 25-85 percent $Al_2O_3$ and 15-75 percent $ZrO_2$.

2. A high-silica glass article according to claim 1 wherein said coating additionally contains $Ta_2O_5$ in an amount ranging up to about 10 percent by weight on the oxide basis.

3. A high-silica glass according to claim 1 wherein said coating consists essentially, in weight percent on the oxide basis, of about 64-75 percent $Al_2O_3$ and 25-35 percent $ZrO_2$, and wherein said devitrification resistant glaze has a thickness in the range from about 10-50 microns.

* * * * *

UNITED STATES PATENT OFFICE
CERTIFICATE OF CORRECTION

Patent No. 3,754,978          Dated August 28, 1973

Inventor(s) Thomas H. Elmer and Joseph W. Malmendier

It is certified that error appears in the above-identified patent and that said Letters Patent are hereby corrected as shown below:

Column 6, Claim 3, line 38, "64-75" should be -- 65-75 --.

Signed and sealed this 19th day of February 1974.

(SEAL)
Attest:

EDWARD M. FLETCHER, JR.          C. MARSHALL DANN
Attesting Officer                Commissioner of Patents